(12) United States Patent
Karakotsios (10) Patent No.: US 9,720,456 B1
(45) Date of Patent: Aug. 1, 2017

(54) CONTACT-BASED DEVICE INTERACTION

(75) Inventor: Kenneth M. Karakotsios, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 765 days.

(21) Appl. No.: 13/555,950

(22) Filed: Jul. 23, 2012

(51) Int. Cl.
*G06F 15/16* (2006.01)
*G06F 1/16* (2006.01)

(52) U.S. Cl.
CPC .................. *G06F 1/1694* (2013.01)

(58) Field of Classification Search
CPC ........... G06F 1/1626; G06F 2200/1637; G06F 3/013; G06F 3/016; G06F 3/017; G06F 3/03547; G06F 3/041; G06F 3/0414; G06F 3/0416; G06F 3/044; G06F 3/0488; G06F 3/14; G06F 3/1423; G06F 1/1694; H04M 2250/10; H04M 2250/22
See application file for complete search history.

(56) References Cited

U.S. PATENT DOCUMENTS

| | | | | |
|---|---|---|---|---|
| 8,464,184 | B1 * | 6/2013 | Cook .................. | G06F 1/1694 709/213 |
| 2007/0124503 | A1 * | 5/2007 | Ramos ................. | G06F 3/017 709/248 |
| 2009/0244015 | A1 * | 10/2009 | Sengupta ............ | G06F 3/04883 345/173 |
| 2010/0167646 | A1 * | 7/2010 | Alameh ................ | G06F 3/017 455/41.2 |
| 2011/0083111 | A1 * | 4/2011 | Forutanpour ......... | G06F 1/1694 715/863 |
| 2011/0148888 | A1 * | 6/2011 | Jacobs ................. | G06F 3/1431 345/502 |
| 2011/0159857 | A1 * | 6/2011 | Faith .................. | G06Q 30/0201 455/414.3 |
| 2011/0167646 | A1 * | 7/2011 | Schmidt ................ | B26B 5/00 30/151 |
| 2011/0189981 | A1 * | 8/2011 | Faith .................... | G06F 1/1694 455/414.1 |
| 2012/0062475 | A1 * | 3/2012 | Locker ................. | G06F 3/041 345/173 |
| 2012/0092283 | A1 * | 4/2012 | Miyazaki .............. | G06F 3/042 345/173 |
| 2012/0242589 | A1 * | 9/2012 | Schmidt ............... | G06F 3/0488 345/173 |
| 2013/0169550 | A1 * | 7/2013 | Gai ...................... | G06F 3/041 345/173 |

* cited by examiner

*Primary Examiner* — Kevin Bates
*Assistant Examiner* — Dae Kim
(74) *Attorney, Agent, or Firm* — Polsinelli LLP (57) ABSTRACT

Computing devices can interact and share data and/or resources in response to detecting a contact event. The devices can include force and/or pressure sensing components that enable the devices to determine when force or pressure is being applied. By comparing information (e.g., time and location) for contact events detected by each device, it can be determined that the devices were brought into contact with each other. In response, the devices can enable data to be transferred between the devices, and can allow resources to be shared for a variety of purposes. In at least some embodiments, users can obtain a larger display screen or enhanced audio capabilities by bringing the devices into contact such that display and/or audio elements of the devices can be used together to present different aspects of the same content.

25 Claims, 5 Drawing Sheets

CONTACT-BASED DEVICE INTERACTION

BACKGROUND

Users are increasingly relying upon electronic devices to access various types of information and perform various types of tasks. In many cases, a user has multiple devices and occasionally wants to be able to transfer information between those devices. In other situations, a user might want to be able to transfer information to another person's device. In many instances the user must determine identity information for the other device, and access an application that enables the user to connect the devices. The user then typically must navigate to an application or interface that enables the devices to share information. Such an approach can be time consuming, and may be frustrating when sharing occurs often or the amount of information to be shared is relatively small, among other such situations. While users can manually transfer information using a flash card or similar object for certain devices, devices such as smart phones and tablet computers might not support use of such devices.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure can overcome one or more of the above-referenced and other deficiencies in conventional approaches to enabling two or more electronic devices to interact. In particular, various embodiments can detect various types of contact events in response to two or more electronic devices being brought into contact, which can indicate that a user wants to perform some action with respect to both devices. In at least some embodiments, each of the devices can include at least one force-sensing element, or other such component, operable to determine when force is applied to at least one region of the device. When such a force is detected, a contact event can be generated that can be analyzed locally or sent to a remote system or service for analysis. If two devices in a similar location detect contact events at substantially the same time, and if the types of contact or force application match within an acceptable matching threshold or other level of confidence, the devices can be determined to have been brought into contact with each other. Using identifying information for each device, the devices can then interact to enable sharing of data and/or resources of the devices. In at least some embodiments the relative orientations of the devices to each other can also be determined, in order to allow for specific functionality such as dragging of items from one device to the other or sharing display screen, among other such options.

Various other functions and advantages are described and suggested below as may be provided in accordance with the various embodiments.

Figure 1:
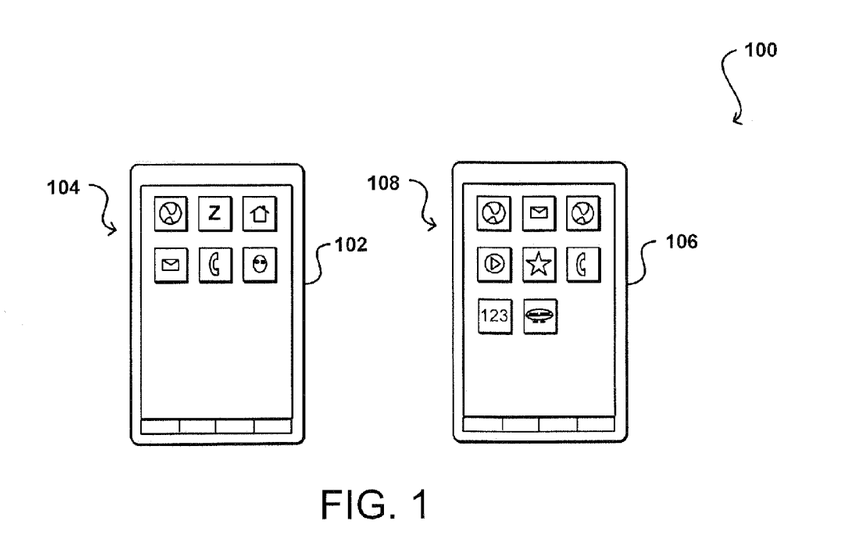
FIG. 1 illustrates an example situation wherein two devices contain content that can be shared in accordance with various embodiments.

FIG. 1 illustrates an example situation 100 in which two devices 102, 106 each store a number of files and applications 104, 108. These devices could be associated with the same user or different users. There might be instances where it is desired to copy or move one of these files or other information from one device 106 to the other 102. For devices such as notebook computers or laptop computers, an object such as a flash card or USB stick can be used to copy information from one device, and then cause that information to be stored to the other device. Such a process requires that a user have one of those objects handy, and typically requires a user to open a folder or interface on each device to assist with the manual transfer. For devices such as many smart phones and tablet computers that do not support these types of objects, however, the process for transferring data often includes emailing files between devices if the files are small enough, or posting the file to a site or network location where a user of the other device can manually download the file. Such approaches can require a significant amount of effort on the part of each user.

Figure 2:
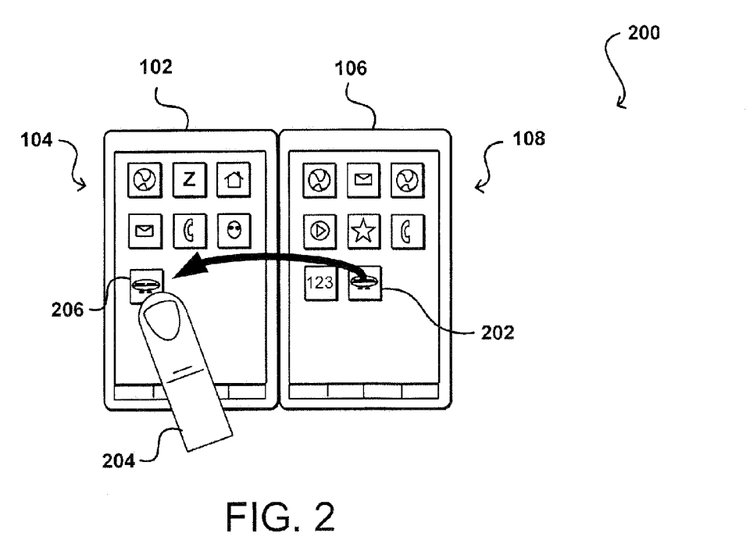
FIG. 2 illustrates an example situation wherein two devices are brought into contact, enabling those devices to interact in accordance with various embodiments.

Approaches in accordance with various embodiments can utilize sensors or other elements of one or more devices to determine when at least two devices are brought into contact, which can then enable those devices to interact for any of a number of different purposes. For example, FIG. 2 illustrates an example situation 200 wherein the two devices 102, 104 of FIG. 1 are brought into contact with each other. It should be understood that reference numbers may be carried over between figures for similar items or objects for purposes of simplicity of explanation, but that such use should not be interpreted as limiting the scope of the various embodiments.

In this example, each device can have at least one sensor, material, or other element that enables the device to detect the application of a force or pressure exerted by another object being brought into contact with the device. These sensors can include, for example, force sensitive resistors (FSRs), pressure sensors, strain gauges, or load cells, among other such elements. In this example, each device includes an FSR layer around at least a portion of the outer edge of the device. The FSR layer can include any appropriate FSR material, such as an interpolating force-sensitive resistance material, among other such options. When the devices are brought into contact, each of the devices can detect an application of force along a side or region of the device. The detected contact can trigger what is referred to herein as a "contact event." A contact event can be triggered or generated each time an amount of pressure or force is detected to be applied to at least one region of the device, where that amount at least meets a determined pressure or force threshold and/or the type of force or pressure matches a contact pattern, such as concurrently contacting at least a minimum distance along the device. In at least some embodiments, the contact might have to occur along a majority of a side of the device to trigger a contact event. Various other types of force or pressure can trigger such events as well.

A contact event can collect, store, and/or provide a variety of information. In at least some embodiments, the event can include a time stamp indicating at least a time of first application of the force, as well as potentially an amount of force applied, distance along which the force is applied, information about how the force was applied, and other such information. Depending at least in part upon the way the contact events are reconciled, the contact event can also include information such as an identifier for the device and/or user, a geographic location of the device, an orientation of the device, and other such information. If it can be determined that each of the devices 102, 106 had a contact event at approximately the same time in approximately the same location, it can be determined that the devices likely were brought into contact such that interaction between the devices can be enabled. As discussed, in at least some embodiments an analysis also can be made of factors such as the amount of force applied, as the forces measured should be approximately equal and opposite. Some embodiments can compare the distance over which the force was applied, as a first device registering contact along four inches of a side should result in a contacting device also registering approximately four inches of contact. Various other such factors can be considered as well within the scope of the various embodiments.

In this example it has been determined that the two devices 102, 106 have been brought into contact, and identifying information for the devices has been used to set up a communication channel between the devices. In some embodiments, the devices can communicate locally using a wireless communication protocol such as Bluetooth®, ZigBee, or Wi-Fi. In other embodiments the devices can communicate over a cellular or other wireless network, and might communicate through a central system or service operable to manage connection events and communications, as is discussed in more detail elsewhere herein. In some embodiments, optical or audio channels can be used to transmit information between devices, among other such mechanisms, as discussed later herein.

FIG. 2 illustrates an example situation 200 that can occur once the two devices 102, 106 are determined to have been brought into contact. In this example, a user is able to select an item, file, or other digital object 202 on one of the devices 106. The user can use any appropriate mechanism to select the object, such as by using a finger 204 with a touch screen, controlling a cursor with a mouse, selecting with a stylus or motion gesture, gazing at the object, etc. The user then can take another action on the other device 102 in order to cause a copy 206 of that digital object to be stored to the second device. Approaches for interacting with the second device can be similar to those discussed for the first device. Such approaches can enable a user to copy or move files between devices. In some embodiments, such an action also can cause a copy of an application or file to be downloaded to the second device 206 from a remote location, as may be controlled by the remote system or service. Various other actions can occur as well.

In some embodiments the relative orientation of the devices can be determined, which can allow for additional functionality. For example, the devices can determine which side of each device is in contact, which can assist in determining where the devices are contacting and how they are placed with respect to each other. One or more orientation sensors such as a GPS, electronic compass, inertial sensor, or other such element also can assist the devices in determining their orientation with respect to the earth, for example, which then can be analyzed to determine the relative orientation of the devices to each other. Other approaches can be utilized as well, such as by using a camera of at least one device to attempt to locate the other device, using at least one speaker on one of the devices and at least one microphone on the other device to perform audio location, etc.

Once the relative orientation is determined, additional functionality can be activated. For example, in FIG. 2 the user is able to "drag" the digital object 202 from one phone to the other in a nearly single motion that continues across the devices, at least those portions that are touch sensitive or are able to sense the position of the finger. In some embodiments, a user might be able to select an item on one device and make a flick or "throw" motion towards the other device, in order to cause the file to be transferred. Other such inputs can be utilized as well.

Figure 3A:
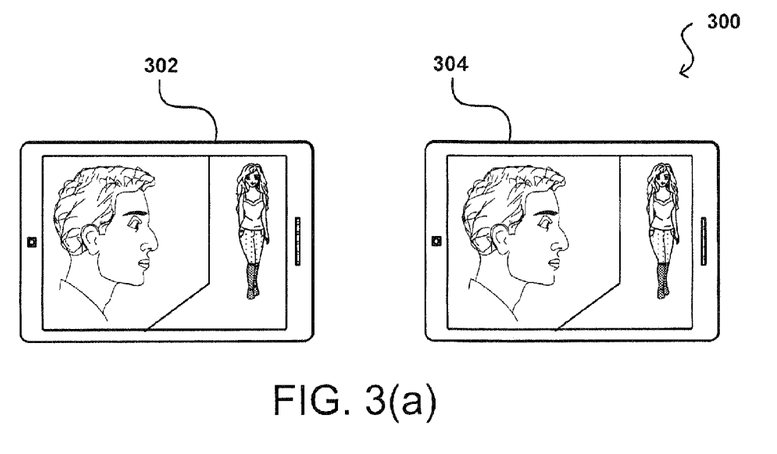
FIGS. 3(a) and 3(b) illustrate a situation wherein an effective display size is able to be increased by contacting devices in accordance with various embodiments.
Figure 3B:
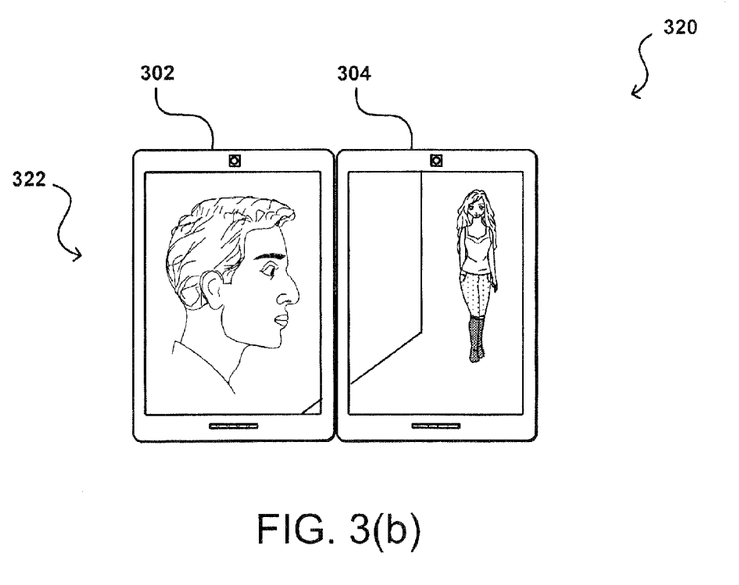

Further, in at least some embodiments the devices can share resources for a common purpose. For example, in the situation 300 of FIG. 3(*a*) there are two devices 302, 304 each displaying the same content, such as a broadcast or streaming media. The size of the media presentation in such a situation is limited by the size of the screen of each device. In the situation 320 of FIG. 3(*b*), however, the users have brought the devices 302, 304 into contact such that the devices can interact. When the devices are communicating or otherwise connected, the presentation can be adjusted, either automatically or in response to input from a user or other entity, such that the presentation is effectively stretched to a larger presentation 322 that utilizes the combined display screens of the two devices. As discussed earlier, the devices can determine their relative orientations and locations with respect to each other in order to determine which portion of the media should be presented on each device, and in which orientation. In at least some embodiments at least one sensor or camera can be used to determine how to orient the presentation across the devices. For example, if the devices are placed upright, as may be determined by an electronic compass or other such element, then the media display can default to an upright orientation. If a camera can capture images that show the user to be to a particular side of the devices, the presentation might be oriented accordingly. Various other such information can be used as well within the scope of the various embodiments.

Figure 4:
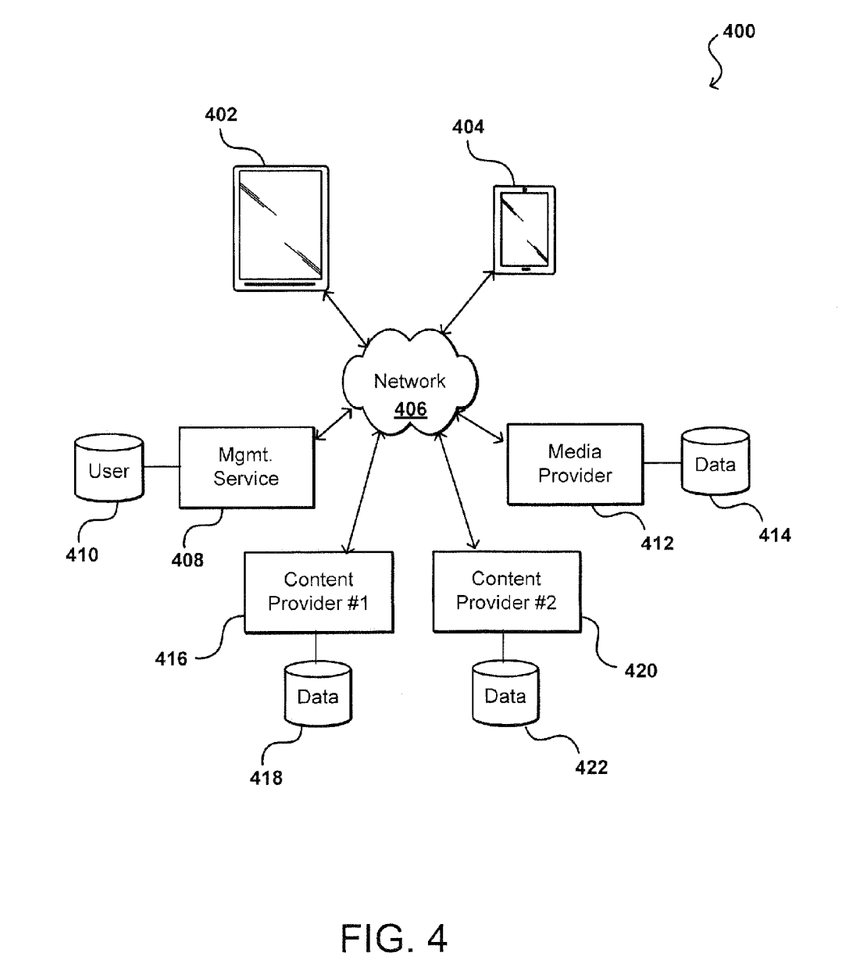
FIG. 4 illustrates an example environment in which various embodiments can be implemented.

As mentioned, computing devices can register, or at least be in communication with, at least one remote system or service operable to identify contact events and enable the devices to communicate and/or share resources. FIG. 4 illustrates an example environment 400 in which various embodiments can be implemented. In this example, there can be one or more client devices 402, 404 of similar or different types, with similar or different capabilities, associated with one or more users. Each client device can make requests over at least one network, such as the Internet or a cellular network, to receive content to be rendered, played, or otherwise presented via at least one of the client devices. In this example, each device subscribes to, or is otherwise associated with, at least one management service 408. Various other systems and services can provide similar functionality within the scope of the various embodiments. In this example, each device 402, 404 is configured to send a request or notification to the management service in response to detecting a contact event. A device can be configured to send the notification at any time the device is active, or when the device has an associated application running, among other such options.

The management service 408 can compare the information received for various contact events in order to determine events that happened at substantially the same time in substantially the same location. In at least some embodiments, the management service can examine time stamps for each connection event and compare connection events that happen within an allowable period of time of each other, as not all devices might be synchronized to the same time. Similarly, the device can look at location information included with the various connection events to determine which of the devices with events at substantially the same time were in substantially the same location. Based at least in part upon this information, the management service can attempt to determine pairs (or larger sets) of connected devices, and enable those devices to communicate and/or share resources. In this example, the management service can receive information for a contact event from each of the devices 402, 404. Upon analyzing the information, the management service can determine that the devices were likely brought into contact with each other. The management service can check various user, device, and/or permission data, as may be stored in at least one data store 410, to determine whether to enable the contacted devices to communicate. In at least some embodiments, the user of each device might provide permission to enable resource and/or data sharing, and in at least some embodiments these users can specify the amount and/or type of sharing to be allowed. For example, a user might enable the screen size or speakers of a device to be used for enhanced media playback, but might not want the other device to be able to exchange data, applications, or other content with the device. Further, such an approach ensures that an unintended user cannot gain access to the device simply by contacting the device with another computing device, etc.

When data is shared or moved between the devices 402, 404, the data can be moved "directly" between the devices using a wireless connection or the data can pass through the network 406 and/or the management service 408. As mentioned, in some embodiments the devices might work together to provide a larger display of movie, a gaming world, or other such content. In some embodiments, each device can receive the media from at least one media provider 412, which can store the media, user account information, and other such data in at least one data store. The devices then can determine which portion of the content to render on the shared screen, for example, and can display the appropriate portion. In other embodiments, however, the management service can work with the media provider, or the devices can provide the sharing information, such that the media provider 412 can provide only the portion of the presentation to be displayed on each device. Such an approach can save bandwidth, as in the example of FIG. 3(*b*) each device is only displaying half of the presentation, so there can be an advantage in not transferring the part that is not to be displayed by each device. Similarly, if a user wants to copy content from one device to the other, one or more content providers 416, 420 might be contacted to cause a copy to be sent to the recipient device, in order to save bandwidth by having a copy uploaded from the "sending" device. Any content being "shared" among devices also can be sent by the content providers, with the appropriate portions of the content being sent to each device.

Figure 5:
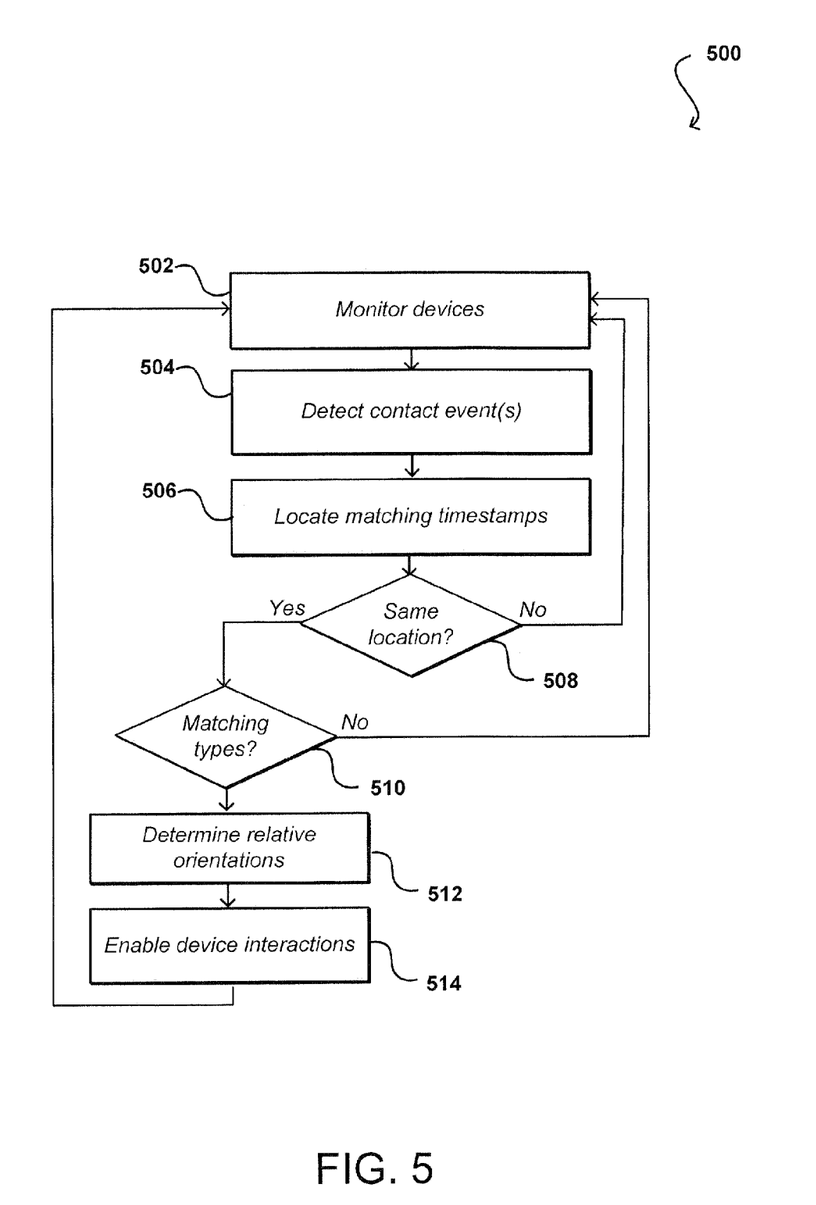
FIG. 5 illustrates an example process for enabling devices to interact in response to contact events that can be utilized in accordance with various embodiments.

FIG. 5 illustrates an example process 500 for enabling devices to interact in response to contact that can be utilized in accordance with various embodiments. It should be understood that there can be additional, fewer, or alternative steps performed in similar or alternative orders, or in parallel, within the scope of the various embodiments unless otherwise stated. In this example, a plurality of devices is monitored 502 by a system or service, such as a management service as discussed with respect to FIG. 4. During the monitoring, a plurality of contact events can be detected 504. In some embodiments notifications can be received for each contact event on a monitored device. Information for the detected contact events can be analyzed to locate 506 matching timestamps, to determine contact events that happened at approximately the same time. If the contact events with matching times are determined 508 to not have occurred at approximately the same location, the monitoring can continue. If, however, the contact events with matching timestamps also occurred at approximately the same location, a determination can be made 510 as to whether the contact events for the devices are of matching types. It should be understood that these and/or other determinations with respect to the contact events can be done in different orders or at substantially the same time in at least some embodiments. If the contact events are determined to not be of a similar type, the monitoring can continue. Two events can be determined to be of the same type if they have, for example, about the same amount of force or pressure exerted over a similar range of area or distance, and in at least some embodiments the force or pressure is exerted in the same pattern or fashion. Various other information can be utilized as well. If the contact events are of matching types, the relative orientations of the devices can be determined 512, such as by using GPS, electronic compasses, cameras, and/or other such elements as discussed elsewhere herein. In addition, interaction can be enabled 514 between the devices, such as to allow the devices to share data and/or resources. As discussed, however, at least some of this functionality can be performed on one or more of the client devices, without the need for a separate system or service.

Even when matching events are located, the monitoring can continue in at least some embodiments. For example, embodiments discussed herein enable more than two devices to be connected, such that it can be desirable to monitor for additional related contact events. Further, a device might want to connect to a different device, and in at least some embodiments such a connection event can also cause a disconnection with a previous device. Various other such approaches can be used as well within the scope of the various embodiments.

In some embodiments, devices might be able to detect the presence of other nearby devices using a wireless protocol such as Bluetooth or Wi-Fi. In response to a contact event, at least one of the devices can attempt to contact one of these other devices over the wireless channel (or a different channel) in order to attempt to determine if one of the nearby devices was involved in the contact event. If so, the devices can communicate with each other and/or share resources without the need for a logically centralized service or intermediate network, etc. Devices being able to communicate directly can avoid the need, in at least some embodiments, to obtain geographic or other location information in order to determine which devices are associated with the contact event.

In some embodiments, devices can determine whether they are in approximately the same location by capturing and comparing images using similarly positioned camera elements. For example, each device can capture at least one image using at least one camera. If the images are substantially the same, assuming a sufficient number of distinct features to make such a determination, the devices can determine that they are likely positioned next to each other.

In some embodiments devices can communicate their proximity without using a wireless channel between the devices. For example, a device detecting a contact event might flash a light or cause a vibration from a haptic element. Another device might use a camera or motion sensor to detect the communication, in order to identify a relative location and/or distance of the device. If each device has at least one light (e.g., a white light or IR LED) and at least one camera in the appropriate locations, the devices can flash to each other to indicate that the proper devices have been determined to be in contact, and to assist with relative orientation determinations.

In at least some embodiments multiple devices can share data and/or components in response to contact events. For example, a user might contact four devices in order to obtain an effective display screen that is approximately four times larger than on a single device. Similarly, a user might contact multiple devices in order to obtain a surround-sound type audio presentation, obtain a brighter or larger projector presentation, or otherwise combine resources from multiple devices.

In some embodiments the devices do not have to remain in contact to continue sharing resources. For example, a movie being displayed might require that the devices remain in contact in order to view a larger display, but sharing data or playing music through multiple speakers might not require the devices to be in contact. For such situations, the contact can be sufficient to initiate the sharing, which can continue until an end event occurs, such as a user going out of range, shutting off a device, closing a related application, etc.

The sharing of information can result in combined items or objects that can be desirable to at least some users. For example, users might be able to contact or stack their devices in order to obtain a shared playlist that includes songs stored to both devices, or at least associated with both devices. Such an approach also can be used to sync contacts or other data between the devices. Such an approach also can allow content on one device to be presented on the other device, which might have improved capabilities, etc.

In some embodiments it might be sufficient that one of the devices can detect the contact event. If the devices are able to communicate using a side channel or other approach discussed herein, detection of a contact event by one of the devices might be sufficient to initiate a process whereby the devices establish at least some type of resource and/or data sharing.

Figure 6:
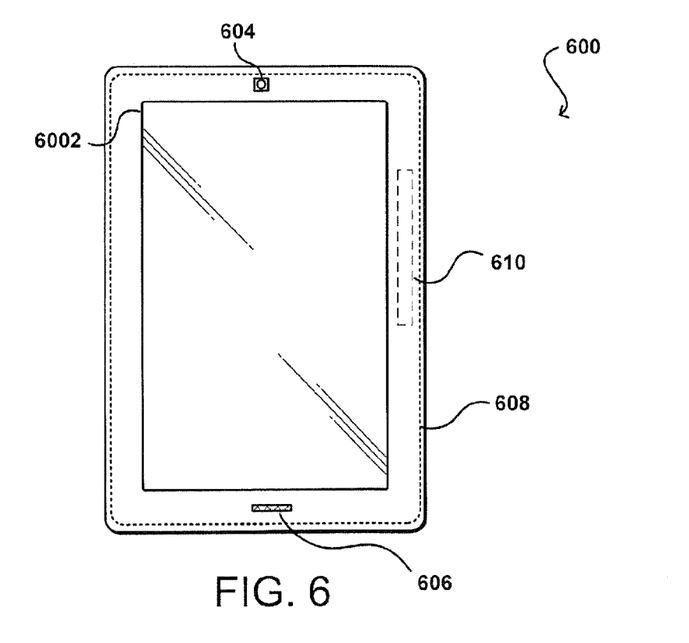
FIG. 6 illustrates an example device that can be used to implement aspects of the various embodiments.

FIG. 6 illustrates an example electronic user device 600 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 600 has a display screen on the front side, which under normal operation will display information to a user facing the display screen (e.g., on the same side of the computing device as the display screen). The computing device in this example includes at least one camera 604 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 600 also includes at least one microphone 606 or other audio capture device capable of capturing audio data, such as words or commands spoken by a user of the device. In this example, a microphone 606 is placed on the same side of the device as the display screen 602, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc. The example computing device 600 also includes at least one networking element 610, such as cellular modem or wireless networking adapter, enabling the device to connect to at least one data network.

The example computing device also includes at least one force-sensing and/or pressure sensing element capable of detecting a force or pressure applied to at least one region of the device. In this example the device has a force-sensitive resistance layer 608 around an edge of the device, and potentially on a back and/or at least one front portion of the device, in order to detect when another device is brought into contact. As discussed, the device also can include at least one orientation-determining element, such as an electronic compass or GPS component, in order to determine a relative orientation of the computing device with respect to another, contacting device.

Figure 7:
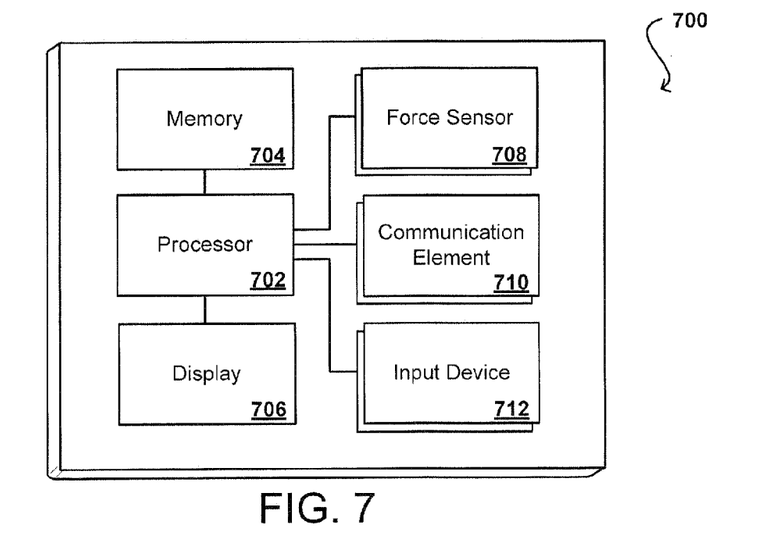
FIG. 7 illustrates example components of a client device such as that illustrated in FIG. 6.

FIG. 7 illustrates a logical arrangement of a set of general components of an example computing device 700 such as the device 600 described with respect to FIG. 6. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one force sensing component 708 such as a force sensing resistor, pressure sensor, or strain gauge, among other such options. Methods for detecting force or pressure using such components are known in the art and as such will not be discussed herein in detail.

In some embodiments, the computing device 700 of FIG. 7 can include one or more communication elements or networking sub-systems 710, such as a Wi-Fi, Bluetooth, RF, wired, or wireless communication system. The device in many embodiments can communicate with a network, such as the Internet, and may be able to communicate with other such devices. In some embodiments the device can include at least one additional input device 712 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 700 also can include at least one orientation or motion sensor (not shown). Such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 702, whereby the device can perform any of a number of actions described or suggested herein.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for establishing communication between computing devices, comprising:
    receiving, from a first computing device, first contact event information representing a first plurality of contact factors that include at least: (a) a first amount of a first force that is detected by the first computing device, (b) a first amount of a first surface area of the first computing device that is contacted, (c) a first geographic location, corresponding to where the first computing device was located, at which the first force was detected, and (d) a first time corresponding to when the first force was detected;
    receiving, from a second computing device, second contact event information representing a second plurality of contact factors that include at least: (a) a second amount of a second force detected by the second computing device, (b) a second amount of a second surface area of the second computing device that is contacted, (c) a second geographic location, corresponding to where the second computing device was located, at which the second force was detected, and (d) a second time corresponding to when the second force was detected;
    determining, based on the first amount of the first surface area being substantially equal to the second amount of the second surface area and at least one other factor of the first contact event information corresponding to a respective contact factor of the second contact event information, that the first computing device is in contact with the second computing device during a first period of time;
    determining a relative position of the second computing device with respect to the first computing device during a second period of time, after the first period of time, that the first computing device is not in contact with the second computing device;
    receiving, from the first computing device during the second period of time, input data corresponding to a representation of content on the first computing device being selected and moved in a direction corresponding to the relative position of the second computing device; and
    causing the first computing device to send the content to the second computing device.

2. The computer-implemented method of claim 1, wherein at least one of the first amount of the first force or the second amount of the second force is detected using a force sensitive resistor or a strain gauge.

3. The computer-implemented method of claim 1, further comprising:
    sharing one or more resources between the first computing device and the second computing device during the first period of time.

4. The computer-implemented method of claim 1, wherein the first contact event information further represents a first duration over which the first force was applied, and the second contact event information further represents a second duration over which the second force was applied.

5. The computer-implemented method of claim 1, further comprising:
    determining a first orientation of the first computing device;
    determining a second orientation of the second computing device; and
    determining a relative orientation of the first computing device with respect to the second computing device based on the first orientation and the second orientation.

6. The computer-implemented method of claim 1, wherein the first contact event information further represents a first pattern of applied force, and the second contact event information further represents a second pattern of applied force.

7. A computer-implemented method, comprising:
    receiving, from a first computing device, first information representing a first plurality of contact factors that include at least a first amount of a first surface area of the first computing device contacted;
    receiving, from a second computing device, second information representing a second plurality of contact factors that include at least a second amount of a second surface area of the second computing device contacted;
    determining, based on the first amount of the first surface area being substantially equal to the second amount of the second surface area and at least one other contact factor of the first information corresponding to a respective contact factor of the second information, that the first computing device contacted the second computing device during a first period of time;
    determining a relative position of the second computing device with respect to the first computing device during a second period of time, after the first period of time, that the first computing device is not in contact with the second computing device;
    receiving, from the first computing device during the second period of time, input data corresponding to a representation of content on the first computing device being selected and moved in a direction corresponding to the relative position of the second computing device; and
    causing the first computing device to send the content to the second computing device.

8. The computer-implemented method of claim 7, further comprising:
    determining a first orientation of the first computing device; and
    comparing the first orientation to a second orientation of the second computing device as part of determining the representation of content on the first computing device being and selected and moved in the direction corresponding to the relative position of the second computing device.

9. The computer-implemented method of claim 7, wherein the first information further represents at least one of a first duration over which the first computing device was contacted, or a first location where the first computing device was located at which the first computing device was contacted, and the second information further represents at least one of a second duration over which the second computing device was contacted or a second location where the second computing device was located at which the second computing device was contacted.

10. The computer-implemented method of claim 9, wherein determining that the first computing device contacted the second computing device includes at least one of:
    determining the first duration corresponds to the second duration; or determining the first location corresponds to the second location.

11. The computer-implemented method of claim 7, wherein the second information is received by the first computing device over a wireless communication channel, and wherein the first computing device determines the first computing device contacted the second computing device.

12. The computer-implemented method of claim 7, wherein the first information is received by a management service, and the management service determines the first computing device contacted the second computing device.

13. The computer-implemented method of claim 12, wherein the first information further represents first geo-location information of the first computing device, the second information further represents second geo-location information of the second computing device, and the method further comprises:
determining the first geo-location information corresponds to the second geo-location information.

14. The computer-implemented method of claim 7, wherein the content includes at least one of gaming content, an application, or media content.

15. The computer-implemented method of claim 7, further comprising:
sharing one or more resources between the first computing device and the second computing device during the first period of time.

16. The computer-implemented method of claim 15, wherein the one or more resources include at least one of a respective display screen, a respective speaker, or a respective projection element of each of the first computing device and the second computing device, and
sharing the one or more resources includes at least one of displaying a portion of an image or a video on the respective display screen of each of the first computing device and the second computing device, playing a different channel of multi-channel audio through the respective speaker of each of the first computing device and the second computing device, or displaying a portion of an image or a video using the respective projection element of each of the first computing device and the second computing device.

17. The computer-implemented method of claim 16, wherein displaying the portion of the image or the video on the respective display screen of each of the first computing device and the second computing device includes splitting the image or the video into a first portion and a second portion based at least in part upon a relative orientation of the first computing device with respect to the second computing device, wherein the first portion is displayed on a first display screen of the first computing device concurrently with the second portion being displayed on a second display screen of the second computing device.

18. The computer-implemented method of claim 7, further comprising:
determining that a third computing device is in contact with at least one of the first computing device or the second computing device during the first period of time; and
sharing one or more resources between the first computing device, the second computing device, and the third computing device during the first period of time.

19. The computer-implemented method of claim 7, further comprising:
determining a relative orientation of the first computing device with respect to the second computing device based on at least one of analyzing direction information from an electronic compass or analyzing image information captured by at least one of the first computing device or the second computing device.

20. The computer-implemented method of claim 7, wherein the contact of the first computing device is detected using at least one of a force sensitive resistor, a pressure sensor, a strain gauge, or a load cell.

21. The computer-implemented method of claim 7, further comprising:
determining whether the second computing device has permission to communicate with the first computing device.

22. The computer-implemented method of claim 7, wherein the first computing device is a first type of device and the second computing device is a second type of device.

23. A computing device, comprising:
at least one processor;
a memory device including instructions that, when executed by the at least one processor, cause the computing device to:
receive, from a first computing device, first information representing a first plurality of contact factors that include at least at least a first amount of a first surface area of the first computing device contacted;
receive, from a second computing device, second information representing a second plurality of contact factors that include at least a second amount of a second surface area of the second computing device contacted and a second time associated with contact of the second computing device;
determine, based on the first amount of the first surface area being substantially equal to the second amount of the second surface area and at least one other contact factor the first information corresponding to the second information, that the first computing device contacted the second computing device during a first period of time;
determine a relative position of the second computing device with respect to the first computing device during a second period of time, after the first period of time, that the first computing device is not in contact with the second computing device;
receive, from the first computing device during the second period of time, input data corresponding to a representation of content on the first computing device being selected and moved in a direction corresponding to the relative position of the second computing device; and
cause the first computing device to send the content to the second computing device.

24. The computing device of claim 23, wherein the instructions when executed further cause the computing device to:
determine a first orientation of the first computing device; and
compare the first orientation to a second orientation of the second computing device as part of determining the representation of content on the first computing device being and selected and moved in the direction corresponding to the relative position of the second computing device.

25. The computing device of claim 23, wherein the instructions when executed further cause the computing device to:
determine that a third computing device is in contact with at least one of the first computing device or the second computing device during the first period of time; and share one or more resources between the first computing device, the second computing device, and the third computing device during the first period of time.

\* \* \* \* \*